Sept. 11, 1923.

L. SATCHWELL 1,467,952

GRID RESISTANCE

Filed June 11, 1923

Inventor:
Leonard Satchwell
By:
Attorney.

Patented Sept. 11, 1923.

1,467,952

UNITED STATES PATENT OFFICE.

LEONARD SATCHWELL, OF SLOUGH, ENGLAND, ASSIGNOR TO THE RHEOSTATIC COMPANY LIMITED, OF SLOUGH, BUCKINGHAMSHIRE, ENGLAND.

GRID RESISTANCE.

Application filed June 11, 1923. Serial No. 644,536.

*To all whom it may concern:*

Be it known that I, LEONARD SATCHWELL, of Trading Estate, Slough, Buckinghamshire, England, having invented certain new and useful Improvements in Grid Resistances, do hereby declare that the following is a full, clear, and exact description of the same.

This invention relates to improvements in grid resistances.

One of the commonest defects in the various forms of grid resistance that have been proposed as substitutes for the cast grid is lack of rigidity, which gives rise to danger of neighbouring grids coming into contact, especially in situations where a rheostat is subject to exceptional vibration. For this reason stamped grids for example are often formed with ribs or corrugations to stiffen their bars lengthwise. They have also been made with alternate bars set forward, and fitted with stiffening wires threaded through the bars in recesses at their ends; these wires running the length of the grid and strengthening its longitudinal edges.

I have found that the stiffness of a grid may be greatly increased by splaying apart the neighbouring lengths of conductor which form the grid by means of a substantially central separator; so that the half lengths of neighbouring bars together with the separator clamped between them form an undeformable triangular frame; and my present invention consists in a resistance element made by cutting, stamping, bending or otherwise forming a length of conductor into a grid having alternate or all bars of the grid bent apart out of the general plane of the grid, and clamped in their inclined position upon an insulated member threaded between alternate bars about mid-way of their length.

Though a number of such grids may be formed, for instance by stamping, from a continuous band of metal, which is afterwards bent to bring the grids parallel with one another, it is convenient to make the grids separately, and it is then important to provide satisfactory means of connecting them electrically. To this end neighbouring grids are provided at adjacent ends with lugs which contact with one another, and these are secured together independently of the bolts by which the several grids are assembled together, so that the electrical connection is not affected by expansion of the assembly bolts.

These and other features of my new rheostat are described hereinafter with reference to the accompanying drawings in which—

Figure 1 is an elevation and

Figure 2 a part plan of what I call a splayed grid.

Figure 1:
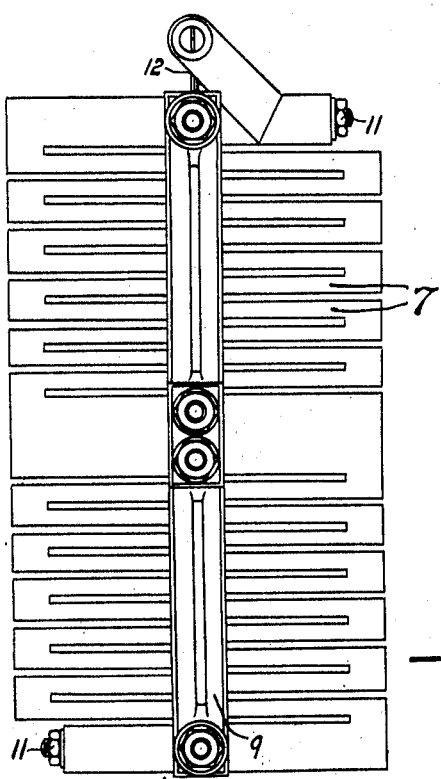
Figure 2:
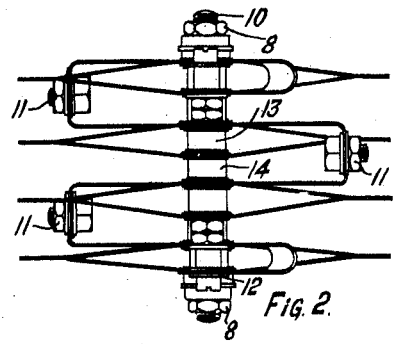
Figure 3:
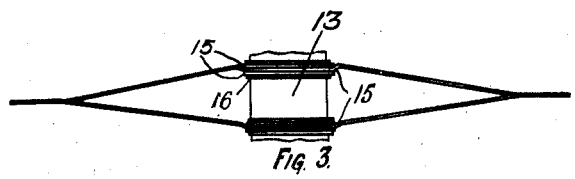
Figure 3 is a detail of the splaying.
Figure 4:
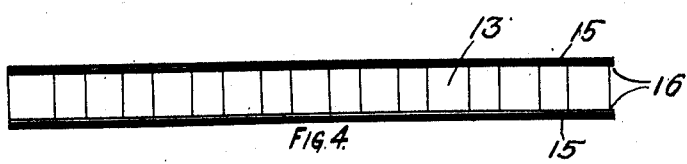
Figures 4, 5 and 6 are details of the insulating member and its component parts.
Figure 5:
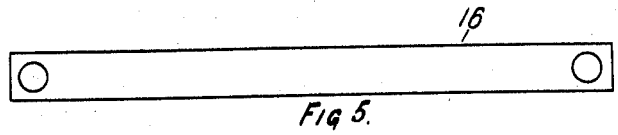
Figure 6:
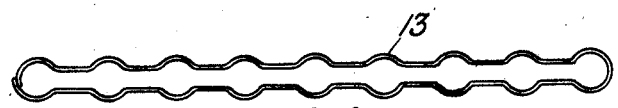

The resistance shown in the drawings is built of stamped grids. Each grid has substantially the form shown in Fig. 1 but initially is flat. Also as originally stamped the slots (or as described below the slits) do not extend quite to either edge of the strip. It is splayed by bending alternate bars 7 of the grid out of their original plane, or, as shown in Figs. 2 and 3, by bending all the bars of the grid out of its plane, alternate bars in opposite directions. To keep the bars thus splayed there is threaded between alternate bars an insulated member 13, which may conveniently be constructed as shown in Figs. 4, 5 and 6. Such a member may also be used to separate one grid from its neighbours. This separator 13 consists essentially of a strip of metal bent out of its plane, for instance as shown in Fig. 6, so as to give it edgewise rigidity, and insulated from the grid conductor by strips of mica 15 preferably supported by flat strips of sheet metal 16 as seen in edge elevation in Figs. 3 and 4, and in face view in Fig. 5.

Such separators 13 are inserted through the component grids so that neighbouring bars of each component grid are on opposite sides of the relative separator; and other separators 14 are placed between neighbouring component grids. The grids and separators are then clamped rigidly together. As shown, both separators and grids are threaded upon insulated bolts 10 which pass through insulated metal stiffening pieces 9 and receive nuts 8. The odd numbered slots or slits are then extended to one edge, and the even numbered slots or slits to the other.

If the component grids are stamped separately instead of from a continuous length, the tips of the end lengths of the component grids will be bent at right angles to the plane of the component grids, so that connection may be made between them by welding, brazing, or riveting, or by a bolt and nuts as shown at 11 in Fig. 2. It is to be noted that these connections, which may also be used as tapping points, are wholly independent of the bolts which fasten the rheostat together, and therefore are unaffected by any slackening of the pressure of the assembly bolts, which may result on the rheostat warming up. With similar advantage the ends of the grids. i. e., the groups of component grids, may be doubled over a projecting end of a separator such as is shown in Figs. 4 to 6, and secured by a bolt passing through the separator to a connector leading to the next grid or to control apparatus or both. This is seen at 12.

In order that strains, due for instance to temperature changes, may not tend to draw through the separators a bar of the component grid which happens to be held less firmly than its neighbours, it is preferable in stamping the grids to form in each an approximately central recess of the same width as the separators, as is seen at 15 in Fig. 3. The separators lie in these recesses, and the small shoulders at their edges prevent any longitudinal movement of the bars.

The method of splaying the grid described with reference to Figs. 2 and 3 permits greater economy of material inasmuch as the transverse slots may be much diminished in width and in fact reduced to mere slits or cuts so that no material is wasted in the stamping of the grids. In this case it is desirable definitely to twist the junction ends of neighbouring bars after the completion of the slits between them so as to turn them all at a slant and thus separate them more widely than the mere insertion of the separator might do. It should be understood, however, that the method of splaying the grid is not confined to its manufacture by bending an originally flat stamped grid. A grid may be stamped in such ways as have been described from a corrugated strip having its corrugations parallel to the direction of the bars of the grid.

What I claim is:—

1. A resistance grid comprising a length of conductor formed into a grid and including bars splayed apart, and an insulated member on which said bars are clamped, said member threaded between said bars about midway of their length.

2. A resistance grid consisting of a metallic sheet cut to form a plurality of bars the junction ends of which are twisted to separate them and an insulated member passed between said bars serving to splay them apart between their junction ends.

3. A resistance grid comprising a plurality of bars splayed apart and recessed between their ends and an insulated separating member passed between said bars and entering the recesses therein.

4. A grid resistance comprising a series of grids, each including a plurality of bars splayed apart between their junction ends, separators between adjacent grids and means for clamping the grids and separators together.

5. A grid resistance comprising a series of grids each including a plurality of bars splayed apart between their junction ends, said grids having lugs at the ends, separators between adjacent grids, means for clamping the grids and separators together, and means for making conductive connection between the lugs of neighbouring grids independently of said clamping means.

6. A resistance grid comprising a length of conductor formed into a grid and including bars, each of which is splayed from its adjacent bar, and an insulating member for retaining the bars in their splayed relation.

7. A resistance grid comprising a length of conductor formed into a grid and including bars splayed apart between their junction ends.

In testimony whereof I have signed my name to this specification in the presence of two subscribing witnesses.

LEONARD SATCHWELL.

Witnesses:
N. N. NORRIS,
F. E. MILLARD.